United States Patent [19]

Embree et al.

[11] 4,046,968

[45] Sept. 6, 1977

[54] INTEGRABLE LINE CIRCUIT FOR USE WITH MINIATURE LINE TRANSFORMER

[75] Inventors: Milton Luther Embree; David Clayton Goldthorp, both of Reading, Pa.; John Francis O'Neill, Boulder, Colo.

[73] Assignee: Bell Telephone Laboratories, Incorporated, Murray Hill, N.J.

[21] Appl. No.: 711,810

[22] Filed: Aug. 5, 1976

[51] Int. Cl.² .............................................. H04Q 1/28
[52] U.S. Cl. ............................. 179/18 FA; 179/16 F
[58] Field of Search ................... 179/16 F, 77, 18 FA, 179/70, 2.5 R, 84 R, 84 A, 81 R; 336/170; 323/48

Primary Examiner—Thomas A. Robinson
Attorney, Agent, or Firm—Howard R. Popper

[57] ABSTRACT

A line transformer circuit in which the DC component of magnetization produced in the tip and ring windings by the battery supplying loop current to the telephone set microphone may be neutralized by an oppositely-poled, serially-connected balancing winding is disclosed. One end of the balancing winding is connected to the supply battery and is, therefore, at AC ground. The other end is kept at a point of high AC impedance to ground by the collector of a transistor so that audio frequency voltages induced in the balancing winding cannot load the transformer. The AC currents in the tip and ring windings are provided with a virtual ground return path by means of a differential amplifier controlled Darlington pair in circuit between the tip and ring windings and the balancing winding. The AC components of the Darlington pair collector current are bypassed to ground by a shunt capacitor at the junction of the Darlington pair collector terminal and the third winding. The differential amplifier senses voltage changes at the virtual ground so that the Darlington pair is driven to suppress these changes. Advantageously, the differential amplifier may be powered from the voltage drop appearing across the Darlington pair thereby facilitating circuit integration.

8 Claims, 1 Drawing Figure

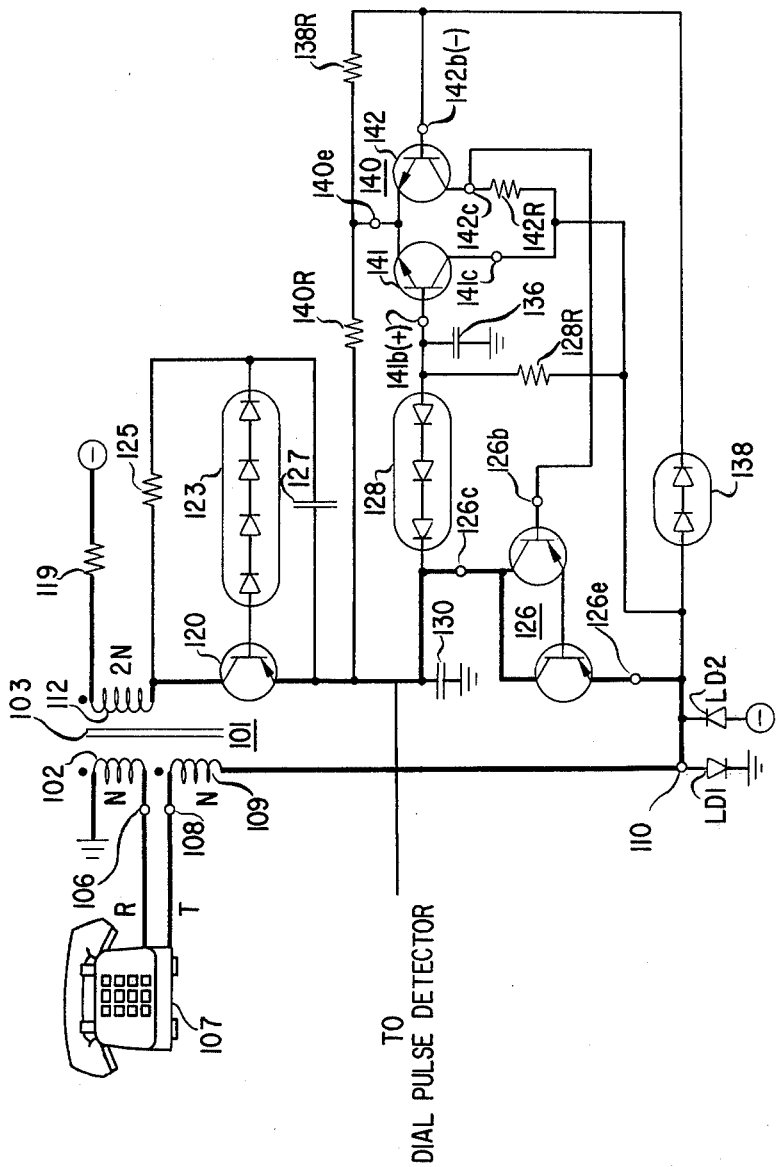

INTEGRABLE LINE CIRCUIT FOR USE WITH MINIATURE LINE TRANSFORMER

BACKGROUND OF THE INVENTION

This invention relates to telephone line circuits and, more particularly, to line circuits for supplying battery feed to one or more remote telephone sets.

Most line circuits for supplying the DC current required by a telephone set's carbon microphone employ a line transformer. The transformer permits a balanced line circuit to be connected to an unbalanced switching path, it provides impedance transformation, and, if properly connected, it prevents longitudinal voltages appearing on the balanced line side from being coupled to its unbalanced side.

The line windings of the transformer either may be connected to carry the DC line current needed by the remote carbon microphone or they may be isolated from the DC current by means of a blocking capacitor. In the latter case, shunt feed inductors must usually be employed to prevent the low-impedance battery supply from short circuiting the AC components of the speech signal.

Heretofore, it has been suggested that the bulky current feed inductors could be replaced by a pair of opposite conductivity-type transistors biased for constant current operation to prevent excessive current on short loops and to provide adequate current on long loops. Examples of this type of shunt feed may be found in J. K. Livingstone U.S. Pat. No. 3,035,122, issued May 15, 1962, and in S. Orbach U.S. Pat. No. 3,955,052, issued May 4, 1976. It is to be noted, however, that these shunt feed arrangements require the use of a high quality blocking capacitor having low leakage and adequate capacitance to provide good AC coupling of speech signals to the transformer winding. In addition, the dielectric material of the blocking capacitor should be able to withstand lightning voltage surges of several hundred volts that may occur if one of the pair of carbon block protectors develops high impedance to ground with age.

On the other hand, in the conventional series feed arrangement, the two split primary windings of the line transformer respectively carry the DC microphone current to the tip and ring conductors of the telephone line. Unfortunately, the need to carry the DC current requires that more "iron" be employed in the transformer core to avoid core saturation. The increased size and weight of such construction detracts from the utility of series feed arrangements in the newer, lightweight and compact styles of construction which have come into vogue in the telephone industry with the advent of printed wiring boards and the expanding usage of integrated circuit technology.

In the copending application of J. F. O'Neill, Ser. No. 711,809, filed of even date herewith, it is shown that the use of a third winding poled oppositely with respect to the tip and ring windings can be used to balance-out their net DC magnetization. The O'Neill application shows that the AC components of the speech signals may be bypassed by a capacitor if the third winding is driven from the collector circuit of a properly biased transistor. The high AC impedance of the transistor collector prevents the third winding from being short circuited by the capacitor at voice frequencies. While it is important that the bypass capacitor be sufficiently large to offer a low impedance path to the "wire components" of speech signals, a capacitor of such size will prevent dial pulses from being easily detected. In the copending application of J. E. Dalley Ser. No. 711,811, filed of even date herewith, it is shown that a negative feedback operational amplifier may be connected in such a manner as to multiply the effective capacitance exhibited by the bypass capacitor at audio frequencies but to saturate in response to step function inputs occasioned by the cessation of line current during dial pulsing so that the bypass capacitor will then exhibit only its intrinsic capacitance and, thereby, not inhibit voltage changes from rising to magnitudes that may be easily detected. While both the Dalley and O'Neill circuits are advantageous from the standpoint of allowing reductions to be obtained in the weight and size of a line transformer, the particular electronic circuitry therein disclosed may not be conveniently integrable. Accordingly, it would be advantageous to obtain a line circuit having a small transformer and which in addition is easily integrable.

SUMMARY OF THE INVENTION

We have discovered that a conveniently integrable electronic circuit for driving the third or balancing winding of a line transformer from a high impedance source and for providing the AC currents in the tip and ring windings with a virtual ground may be achieved by providing separate transistor circuits for the high impedance drive and the virtual ground supply and by controlling the separate ground-supplying transistors from a differential amplifier that may be powered by the voltage drop appearing across the virtual ground-supplying transistors. In our circuit, the balancing winding is connected between the central office battery and the collector of a first transistor biased to remain out of saturation for the range of line currents occurring on either long or short loops. The emitter of this transistor is connected to the collector of a Darlington pair and the point of connection is bypassed to ground by a capacitor of suitable size. The base of the Darlington pair is driven by the output of a differential amplifier whose negative input senses any deviation from AC ground of the point of connection of the Darlington emitter with the tip and ring windings of the line transformer. This node is, therefore, brought to the same AC ground potential as the positive input of the differential amplifier which is bypassed to ground; in other words, the node is caused to be a virtual AC ground. Advantageously, the emitter-collector supply for the differential amplifier may be obtained directly from the voltage drop appearing across the Darlington pair and the circuit, being self-contained, may be integrated on the same chip as the Darlington pair and the current supply transistor connected to the balancing winding.

In addition, it is to be noted that the location in the circuit of the capacitor bypass to ground for voice frequency signals is such that any longitudinal signals appearing on the loop will be shunted to ground through this capacitor instead of flowing through the third winding. Moreover, because the shunt capacitor is removed by the collector circuit of the Darlington pair from direct connection to the subscriber loop, dial pulsing changes may be somewhat more easily detected than in the embodiment disclosed in the copending O'Neill application referred to above.

DESCRIPTION OF THE DRAWING

The foregoing and other objects and features of our invention may become more apparent by referring now to the drawing, the single FIGURE of which shows a three winding transformer line circuit employing a wholly integrable transistor circuit for providing immunity from longitudinal unbalance and other advantages hereinafter to be discussed.

GENERAL DESCRIPTION OF THE DRAWING

Transformer 101 includes a primary ring winding 102 connected between ground and terminal 106. The ring conductor R of the subscriber loop extends between the remote telephone set 107 and terminal 106. The primary tip winding 109 extends between reference terminal 110, at which a virtual AC ground will be provided, and terminal 108 to which the tip conductor T of the subscriber loop leading from telephone set 107 is also connected. Primary windings 102 and 109 each have the same number of turns N and are poled so as to be series-aiding with respect to the magnetic field they produce in core 103. A third or balancing winding 112 having as many turns (2N) as the sum of the turns of windings 102 and 109 is connected between resistance battery 119 and terminal 110 via a current path, hereinafter to be described in greater detail, which current path comprises transistor 120 and Darlington transistor pair 126. Winding 112 is poled so as to be series-opposed with respect to the flux field produced in core 103 by windings 102 and 109.

It is an important aspect of the operation of our invention that the same DC current flows through balancing winding 112 and tip and ring windings 102 and 109 so that winding 112 neutralizes the DC magnetic field produced by windings 102 and 109. The AC component of signal current in windings 102 and 109 is provided with a virtual ground return at reference node 110 so that AC current is not permitted to flow through winding 112. Further, the AC signal voltage induced in winding 112 by the changing flux field from windings 102 and 109 is not permitted to cause any appreciable current flow in any circuit connected to winding 112. The manner in which these features are effected in the illustrative embodiment will be hereinafter described in detail.

Transformer 101 includes a secondary winding (not shown) which operates in the conventional fashion of line circuit transformer secondary windings and will not be further discussed herein except to note that while primary windings 102 and 109 are designed to present a carefully balanced-to-ground impedance to the loop comprising tip and ring conductors, T, R, the secondary winding (not shown) may be connected to a circuit, typically the switching network, which may be unbalanced with respect to ground.

In order to allow the AC components of loop current to flow in windings 102 and 109 and to provide the required balance to assure longitudinal signal cancellation, node 110 must be at an effective alternating current ground. Darlington pair 126 functioning with differential amplifier 140 presents a low AC impedance between terminal 110 and ground. Differential amplifier 140 inputs 141b (+) and 142b (−) sense any deviation from AC ground potential occuring at node 110. Output 142c of amplifier 140 drives Darlington pair base 126b in such a manner as to reduce the potential change. Amplifier 140 thus operates as a "servo" amplifier to maintain node 110 at an effective or virtual AC ground.

Capacitor 136 is connected to provide an AC ground to the base 141b constituting the positive (+) input of differential amplifier 140. The negative (−) input 142b of differential amplifier 140 is connected to terminal 110. Let it be assumed that node 110 undergoes a positive voltage excursion. This positive change is sensed at differential amplifier base 142b causing transistor 142 to increase the current drawn through collector resistor 142R and lowering the potential at its collector output 142c. The lower potential at output 142c is applied to the base 126b of Darlington pair 126. The Darlington pair operates in the fashion of an emitter-follower. Accordingly, the potential at the Darlington emitter 126e is lowered, overcoming the assumed tendency of reference node 110 to undergo the positive excursion. A similar but opposite sequence of events would transpire had it been assumed that reference node 110 attempted to undergo a negative voltage excursion.

It is to be noted that the collector power supply for differential amplifier 140 is obtained from the emitter 126e-to-collector-126c potential of Darlington pair 126. This connection includes common emitter resistor 140R of the differential amplifier 140 connected to Darlington collector 126c and transistor 142 collector resistor 142R connected to Darlington emitter 126e. Diodes 128 and 138 provide appropriate DC biasing potentials from these points to the bases 141b and 142b of transistors 141 and 142 comprising differential amplifier 140. Resistor 128R is of appropriate value to provide DC current flow through diodes 128 to establish the operating point for the base of transistor 141. Resistor 138R is provided to draw sufficient current through diodes 138 so as to stabilize their voltage drop independently of the $\beta$ of transistor 142.

Lightning protection diodes LD1 and LD2 are connected to reference node 110 and poled so that diode LD1 provides a ground path for excessive positive lightning strikes on the loop and diode LD2 provides a ground for any negative lightning strike exceeding the potential of the central office battery.

The DC current supply path for the subscriber loop comprising telephone set 107 and the tip and ring conductors T, R is obtained from resistance battery 119, the resistance of which advantageously may be of the order of 600 ohms. The line current path may be traced from resistance battery 119 through balancing winding 112, the collector-emitter path of transistor 120 and of Darlington circuit 126, tip winding 109, the tip and ring conductors T, R of the subscriber loop and winding 102 to ground. AC components of signal voltage induced in balancing winding 112 by the AC fluxes transformer coupled through core 103 from the tip and ring windings 102 and 109 are presented with the high collector impedance of transistor 120. Accordingly, these AC signal voltages effectively "see" an open circuit and do not flow through bypass capacitor 130 to ground. The "wire components" of AC signal current, as well as any longitudinal voltages induced in the subscriber loop and flowing in windings 102 and 109, are provided with a low impedance path to ground at capacitor 130 because Darlington circuit 126 presents a path for these currents in the direction from node 110 to capacitor 130. Thus neither longitudinal voltages nor AC components of signal current can flow through winding 112.

Current supply transistor 120 is biased to remain out of saturation for the maximum AC signal voltage that may be induced in winding 112. The number of biasing diodes 123 is selected so that the collector of transistor 120 will always be more negative than the emitter thereof for the peak value of the maximum expected induced voltage appearing across winding 112. Resistor 125 is provided to prevent capacitor 127 from providing a low impedance path in shunt with transistor 120 for these induced AC voltages. Assuming the voltage drop across each of the diodes in diode circuit 123 to be 0.7 volts and the maximum peak signal inducible in winding 112 to be 2.45 volts it is seen that transistor 120 is kept out of saturation by a margin of at least 0.35 volts.

It is to be understood that while only a simple differential amplifier 140 has been shown, a more sophisticated operational amplifier circuit may be employed and that other types of emitter follower circuits may be substituted for the Darlington pair. In the illustrative embodiment other changes will be apparent to those of skill in the art without departing, however, from the spirit and scope of our invention.

What is claimed is:

1. A telephone line circuit comprising:
    a transformer having tip, ring and balancing windings, said balancing winding being poled in opposite sense to said tip and ring windings;
    first and second solid-state means electrically connected between said tip and ring windings and said balancing winding;
    capacitor means in series with said first solid-state means and said balancing winding; and
    servo amplifier means for driving said second solid-state means substantially to suppress any variation in the AC potential of the junction of said second solid-state means with said tip and ring windings.

2. The invention of claim 1 wherein said servo amplifier means includes a differential amplifier and power supply means therefor including means for connecting said amplifier in DC shunt with the collector-emitter path of said second solid-state means.

3. The invention of claim 2 wherein said power supply means includes potential-dropping diodes within said DC shunt connection.

4. A telephone line circuit comprising:
    a transformer having serially connected tip, ring and balancing windings,
    a first transistor circuit exhibiting a high AC impedance to voltages induced in said balancing winding,
    a second transistor circuit providing a DC current path between said first transistor circuit and said tip and ring windings, and
    means for controlling said second transistor circuit to provide a virtual AC ground at the point of connection of said second transistor circuit with said tip and ring windings.

5. The invention of claim 4 wherein said second transistor circuit includes a grounded capacitor at the collector of the transistor of said second transistor circuit.

6. The invention of claim 4 wherein said means for controlling comprises differential amplifier means for sensing any potential change occurring at said point of connection.

7. The invention of claim 6 wherein said differential amplifier means includes a transistor collector-emitter path connected between said point of connection and said grounded capacitor.

8. The invention of claim 5 further including means connecting said grounded capacitor in series with said balancing winding and said first transistor circuit.

* * * * *